United States Patent [19]

Edge et al.

[11] 3,761,736

[45] Sept. 25, 1973

[54] PROXIMITY SWITCHES

[75] Inventors: Gordon Malcolm Edge; Peter William Lee, both of Cambridge, England

[73] Assignee: Godwin Warren Engineering Limited, High Wycombe, Buckinghamshire, England

[22] Filed: Apr. 10, 1972

[21] Appl. No.: 242,629

[30] Foreign Application Priority Data

May 12, 1971 Great Britain .................. 14,456/71

[52] U.S. Cl. ............ 307/116, 200/5 A, 200/DIG. 1, 317/DIG. 2, 340/365

[51] Int. Cl. ............................................ H01h 35/00

[58] Field of Search ............ 200/5 A, 52 R, DIG. 1; 307/116; 317/DIG. 2; 340/365 C

[56] References Cited

UNITED STATES PATENTS

| | | | |
|---|---|---|---|
| 3,691,555 | 9/1972 | Looschen | 200/DIG. 1 |
| 3,651,391 | 3/1972 | Vogelsberg | 200/DIG. 1 |
| 3,588,875 | 6/1971 | Gabor | 200/5 A UX |
| 3,503,031 | 3/1970 | Nyhus et al. | 200/DIG. 1 |
| 3,492,440 | 1/1970 | Cerbone et al. | 200/DIG. 1 |
| 2,659,533 | 11/1953 | Quinby et al. | 200/DIG. 1 |
| 3,643,041 | 2/1972 | Jackson | 200/5 A UX |

*Primary Examiner*—J. V. Truhe
*Assistant Examiner*—William J. Smith
*Attorney*—David Toren et al.

[57] ABSTRACT

A proximity switch, the sensing portion of which is an insulated electrode whose capacitance can be changed, for example by bringing one's finger close to the electrode, to operate the switch, wherein the charge in capacitance is coupled into a bridge circuit which has a delayed self-balancing action, so that rapid changes in capacitance will operate the switch but long term slow changes in the capacitance will fail to operate the switch.

6 Claims, 2 Drawing Figures

PROXIMITY SWITCHES

This invention relates to proximity switches intended for manual operation by human beings, or for operation by moving parts of machinery or by moving components, parts or objects assembled by or operated on by machines, examples being machine tool tables, knitting machine needles and bottles and other containers of various types.

One serious problem encountered with switches of this type is the build-up of dirt, grease, etc., on the part of the switch intended to act as the sensor and this can lead to spurious spontaneous operation of the switch. This problem is considerably aggrevated when the switch is intended to be used outdoors due to the likely further effects of rain, snow, etc , to an extent that such switches have not normally been found to be usable in an outdoor environment.

It is an object of the present invention to provide an improved proximity switch in which the above problems are effectively overcome.

The present invention comprises a proximity switch, the sensing portion of which is an insulated electrode whose capacitance can be changed, for example by bringing one's finger close to the electrode, to operate the switch, wherein the change in capacitance is coupled into a bridge circuit which has a delayed self-balancing action, so that rapid changes in capacitance will operate the switch but long term slow changes in the capacitance will fail to operate the switch.

The self balancing action will also compensate for permanent and temporary component value changes in the bridge circuitry due to the effects of temperature cycling or other effects.

Figure 1:
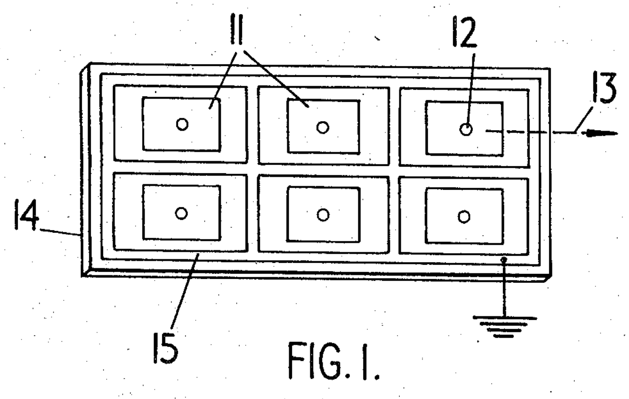
Figure 2:
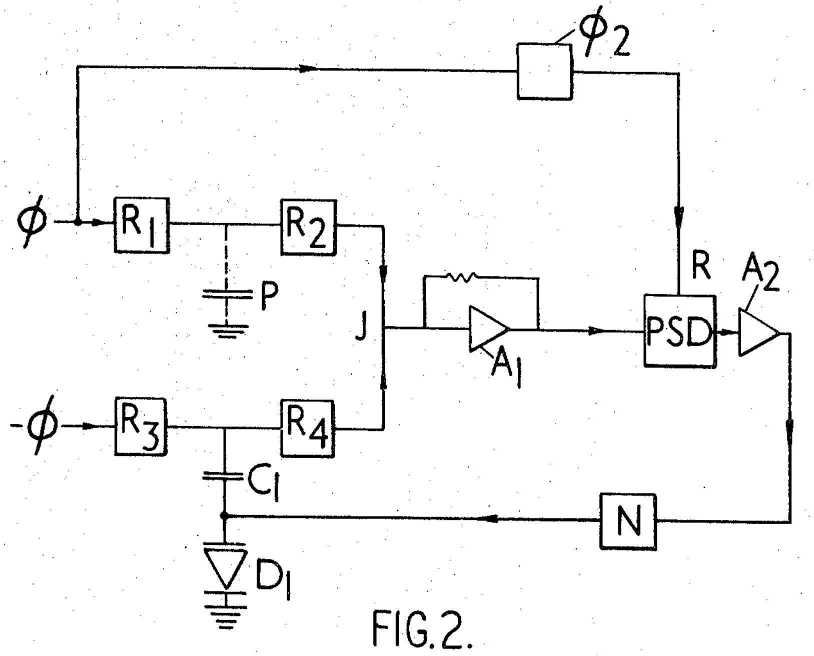

In the accompanying drawings:

FIG. 1 is a diagrammatic front view of a panel of six proximity switches according to the present invention, and FIG. 2 shows a circuit a sociated with one of the switches.

As an example of one convenient method of putting the invention into use, FIG. 1 shows a panel of six switches, each of which consists of an electrode in the form of rectangular area 11 of electrically conductive material provided in the form of a thin layer by means of printed circuit techniques upon an insulating plate 14. Each area 11 is surrounded by a gurad ring provided by a printed grid 15 connected to earth. This serves to prevent inadvertent operation of two adjacent switches simultaneously. Each area 11 is electrically connected by a lead, such as lead 13 to a circuit which will be described with reference to FIG. 2.

Each area 11 has a central aperture 12 behind which suitable means (not shown) is provided to illuminate the aperture when the switch is operated.

FIG. 2 shows a circuit in which P represents the capacitance between the area 11 and earth. The capacitance P and the series combination of a reference capacitor $C_1$ and a voltage variable capacitor $D_1$ conveniently in the form of a reversed biased silicon diode, are connected into a bridge circuit comprising $R_1$, $R_2$, $R_3$ and $R_4$.

The bridge is made self-balancing in the following way.

The bridge is energised by two input signals which are of identical frequency, say IKH$_z$, but opposite in phase, $\phi$ and $-\phi$. Two inputs from the bridge, one from $R_2$ and one from $R_4$, are summed by summing amplifier $A_1$ whose output is fed to a phase sensitive detector PSD having as a phase reference signal R one of the two inputs $\phi$ whose phase may be adjusted by network $\phi_2$.

A d.c. output from the detector PSD is amplified by amplifier $A^2$ and fed back via delay circuit N to control the variable capacitor $D_1$.

The phasing of the feedback signal is such as to maintain a null signal at the output of amplifier $A_1$. Thus if the signal from either half of the bridge tends to dominate, the d.c. control signal will act so as to bring the bridge back into balance with zero output from amplifier $A_1$.

The delay circuit N is so chosen that the feedback circuit takes several seconds to respond to a change in the value of capacitance P.

As a result, the circuit will respond to the sudden change in the value of P which occurs when a finger or hand is brought close to the area 11, but the circuit will not respond to, and will automatically compensate for, the majority of natural environment changes, such as rain, snow, grease, etc., which are relatively long term changes.

The operative output from the switch may be taken in the form of a d.c. signal from the output of amplifier $A_1$, or in the form of an a.c. signal from the summed outputs from the bridge.

The operative output may be used to provide conventional on/off digited signal, or it may be used to provide an analogue signal proportional to proximity.

Conveniently, the circuit may be provided in the form of an integrated circuit at the rear of insulating plate 14.

It will be appreciated that the proximity switch described above has a number of advantages not only over conventional switches but also over known proximity switches.

It has the advantages of being insensitive to vibration, temperature or humidity or changes therein, of being robust and having no moving parts to suffer wear, and being proof against the build up or ingress of dust, swarf, coolant or other fluids, paint, steam, or other agents resulting from the local environment.

We claim:

1. An apparatus for responding to proximity of objects by behaving as a switch, comprising a bridge circuit having two bridge arms, supply means for supplying two alternating current signals, one to each of said arms, said two signals being of the same frequency but of opposite phase, sensing means including an insulated electrode connected to a first one of said bridge arms, said sensing means forming a capacitance with said insulated electrode, a phase-sensitive detector connected to sum the outputs of the two bridge arms, a variable reference capacitor connected to a second one of said bridge arms, control means responsive to said phase-sensitive detector and coupled to said variable capacitor for varying the capacitance of said variable capacitor in response to long-term slow changes in the capacitance of said sensing means so that the output of said detector remains balanced and for preventing rapid changes in the capacitance of said sensing means from balancing said bridge arms, said control means including delay circuit means connected to the output of said phase-sensitive detector and having an output for controlling the capacitance of said variable reference capacitor with a delay.

2. A switch as in claim 1, wherein said sensing means includes a grounded guard ring surrounding said electrode.

3. An apparatus as in claim 1, wherein said variable reference capacitor is connected to ground and said sensing means forms its capacitance with said electrode between said electrode and ground.

4. A apparatus as claimed in claim 1, wherein said reference capacitance includes a voltage variable capacitor.

5. A apparatus as claimed in any one of claims 1, wherein a number of electrodes are provided on a single panel, each electrode being provided with a separate bridge circuit.

6. A apparatus as claimed in claim 5, wherein each electrode is surrounded by an grounded guard ring.

* * * * *